United States Patent [19]
Mailhos-Lefievre et al.

[11] Patent Number: 5,272,228

[45] Date of Patent: Dec. 21, 1993

[54] PREPARATION OF (CO)POLYMERS SOLUBLE IN THEIR (CO)MONOMER COMPOSITIONS

[75] Inventors: Valérie Mailhos-Lefievre, Chantilly; Pierre Nogues, Bernay, both of France

[73] Assignee: Elf Atochem S.A., Puteaux, France

[21] Appl. No.: 846,248

[22] Filed: Feb. 21, 1992

[30] Foreign Application Priority Data

Feb. 21, 1991 [FR] France ................... 91 02076

[51] Int. Cl.$^5$ .............................. C08F 2/24; C08F 4/30
[52] U.S. Cl. ...................................... 526/81; 524/457; 524/458; 524/460; 526/79; 526/80; 526/88; 526/89; 526/201; 526/202; 526/207; 526/213; 526/225
[58] Field of Search ................... 524/457, 458, 460; 526/79, 80, 81, 88, 89, 201, 202, 207, 213, 225

[56] References Cited

U.S. PATENT DOCUMENTS 5,047,488 9/1991 Nogues et al. ................... 526/88

*Primary Examiner*—Paul R. Michl
*Assistant Examiner*—Peter Szekely
*Attorney, Agent, or Firm*—Burns, Doane, Swecker & Mathis

[57] ABSTRACT

(Co)polymer particulates soluble in their corresponding (co)monomer composition, e.g., particulates of acrylic, methacrylic or styrene polymers, are produced by finely dispersing an aqueous phase including at least one polymerization initiator in an organic phase which comprises such (co)monomer composition and at least one nonsolvent for such (co)polymer which is miscible with such (co)monomer composition, and suspended emulsion polymerizing such mixed-phase polymerization recipe.

20 Claims, No Drawings

PREPARATION OF (CO)POLYMERS SOLUBLE IN THEIR (CO)MONOMER COMPOSITIONS

BACKGROUND OF THE INVENTION

1. Field of the Invention

The present invention relates to the preparation of polymers or copolymers, i.e., (co)polymers, essentially of the acrylic, methacrylic or styrene type, which are soluble in their starting monomer or comonomer compositions, by suspended emulsion polymerization of such corresponding monomer or monomers.

2. Description of the Prior Art

By "suspended emulsion polymerization" is intended a polymerization, in the presence of an initiator system, at least one of the constituents of which is soluble in water, of at least one monomer in an aqueous phase dispersed in finely divided form.

In general, suspended emulsion polymerization may be carried out in the event that the monomer or monomers may be polymerized in emulsion, since the polymerization is conducted within the discontinuous aqueous phase and proceeds by progressive dissolution of the monomer, which forms the continuous phase of the reaction mixture.

According to the solubility or the insolubility of the (co)polymer (formed in the aqueous phase in the form of a latex) in the (co)monomer phase, two techniques are distinguished:

(1) In the event that the (co)polymer is insoluble in its (co)monomer composition (for example, in the case of PVC and PAN), the polymer precipitates and remains in the droplet of particles having a spherical appearance. This technique is described in French Patents Nos. 69/01,008, 69/37,326, 69/37,327, and 87/03,636.

(2) In the event that the (co)polymer is soluble in the (co)monomer phase, the reaction product is a mixture of a solution of (co)polymer in its (co)monomer composition and the aqueous initiating phase. The recovery of the polymer then proceeds via a costly treatment of such mixture (precipitation, drying, and the like).

SUMMARY OF THE INVENTION

A major object of the present invention is the provision of improved technique for suspended emulsion polymerization wherein the final polymer is prevented from going into solution in the monomer phase, by adding one or more nonsolvents for the (co)polymer, which are miscible with the monomer or monomers, to said (co)monomer phase.

The process of the invention produces, for example, (co)polymers in particle form, the average diameter of which, in general, ranges from 0.1 to 2000 $\mu$m, the porosity thereof, estimated via plasticizer uptake at room temperature, in general, ranges from 2 to 200 g of dioctyl phthalate (DOP) per 100 g of resin, and the apparent density per unit volume of which, in general, ranges from 0.10 to 1.0 g/cm$^3$.

DETAILED DESCRIPTION OF THE PREFERRED EMBODIMENTS OF THE INVENTION

More particularly according to the present invention, it will be appreciated that, in the event of suspension polymerization, the use of colloidal systems is necessary in order to obtain particles of the desired morphology and particle size, while the process of the present invention makes it possible to produce particles of comparable particle size without having to use a surfactant system. On the one hand, this reduces the cost of the product and, on the other, improves the purity of the resin and that of the polymerization liquors. In addition, by varying the initial ratio of the aqueous phase to the organic phase ((co)monomer and nonsolvent(s) composition), it is possible to influence the final porosity of the resin. For example, for an initial ratio by volume of the aqueous phase with respect to the organic phase of about 10%, vitreous particles are produced which are comparable to those produced in suspension; for an initial ratio by volume of aqueous phase/organic phase of more than 60%, particles of high porosity are obtained.

According to the process of this invention, the aqueous phase, containing at least one of the initiators, is dispersed in the organic phase, namely, the (co)monomer composition and the nonsolvent or nonsolvents, and the polymerization of such composition is then carried out. The volume of water used in the process of the invention typically ranges from 1% to 100% and preferably from 10% to 80% of the volume of the organic phase. The amount of water constitutes, in general, at least 1% and preferably at least 10% with respect to the volume of the (co)monomer composition and the nonsolvents.

In a first embodiment of the invention, after formulating an aqueous solution of at least a fraction of the initiator system, a finely divided dispersion of said solution in the previously homogenized organic phase containing the monomer or monomers and the nonsolvent or nonsolvents is produced and the reaction mixture prepared in this manner is then polymerized in a single stage, carried out with moderate stirring. The dispersion may be effected, for example, by means of strong shearing agitation or by the use of an injection nozzle permitting the aqueous solution to be introduced directly into the organic composition.

In a second embodiment of the invention, the operation for finely divided dispersion of the aqueous solution of at least a fraction of the initiator system in the organic phase and commencing the polymerization of the latter under high-turbulence agitation are carried out conjointly in a first stage until a degree of conversion generally ranging from 1% to 50% and preferably from 3% to 25% is attained. Once this degree of conversion has been attained, a complementary mixture of (co)monomer composition and nonsolvent(s), identical to/or different from that employed in the first stage, is added to the reaction mixture, if appropriate, and the reaction mixture is then polymerized, in a second stage, under agitation which is slow but which remains sufficient to prevent the reagglomeration of the particles being developed.

In a third embodiment of the invention, the operations for finely divided dispersion of the aqueous solution of at least a fraction of the initiator system in the (co)monomer composition and the nonsolvent(s) and for prepolymerization of the latter under high-turbulence agitation are carried out conjointly in a first step, in an apparatus designated a "prepolymerizer", until a degree of conversion generally ranging from 1% to 30% and preferably from 3% to 15% is attained and, in a second step, the reaction mixture is then subjected to a final polymerization under agitation which is slow but which remains sufficient to prevent the reagglomeration of the particles being developed.

According to this third embodiment of the invention, it is possible, in the interval between the two steps, to add to the reaction mixture a complementary mixture of (co)monomer composition and nonsolvent(s) which is identical to/or different from that employed in the first step. The addition of such complementary (co)monomer composition and nonsolvent(s) (organic phase) to the reaction mixture may be carried out before, during and/or after transfer of the reaction mixture into the polymerizer.

It is also possible to carry out a preliminary operation for dispersion, according to the invention, of an aqueous solution of at least a fraction of the initiator system in finely divided form in a mixture of (co)monomer composition and nonsolvent(s), and then to dissolve the complementary fraction of the initiator system in a (co)monomer composition and nonsolvent(s) conjointly with a polymerization operation conducted in one or two stages, or carrying out a prepolymerization operation followed by a final polymerization.

It is also possible, in the event that an initiator system composed of a plurality of water-soluble constituents is used, to introduce the aqueous solutions of said constituents separately into the reaction mixture at various stages of the polymerization process.

The process of the invention may also be carried out continuously, in particular in accordance with the techniques described in the French Certificates of Addition indicated above (69/37,326 and 69/37,327).

According to the present invention, it is possible to introduce at least one emulsifier and/or at least one suspending agent into the reaction mixture, most typically via the aqueous solution of at least a fraction of the initiator system. In the event of preparation of (co)polymers based on methyl methacrylate (MMA) which have an average particle diameter greater than about 10 $\mu$m, the process of the invention produces, in the absence of emulsifier, resins which are likewise of substantially spherical shape and in which the shape of the particles is substantially spherical. In the presence of emulsifier, all other conditions being equal, resins are produced which are likewise of substantially spherical shape and the particles of which have a narrower particle size distribution.

Exemplary emulsifiers include, for example:

(i) those of cationic type, such as the quaternary ammonium salts having the general formula:

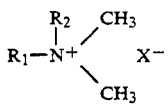

in which $R_1$ and $R_2$ are aliphatic or aromatic radicals and X is a halogen, (ii) those of anionic type, such as fatty acid soaps, alkali metal alkyl sulfates, alkali metal alkylsulfonates, alkali metal alkylarylsulfonates, alkylsulfosuccinates and alkali metal alkyl phosphates, and (iii) those of nonionic type, such as the polycondensation products of ethylene oxide and/or propylene oxide with various hydroxyl-containing organic compounds, such as fatty alcohols and nonylphenols.

The above emulsifiers may be used either alone or in admixture.

Exemplary suspending agents include, for example: polyvinyl alcohols, cellulose derivatives, such as methyl cellulose or carboxycellulose, and gelatins.

The proportion of emulsifier and/or suspending agent which may be used generally ranges from 0% to 2% and preferably from 0% to 0.5% by weight, with respect to the organic phase.

To advantageously carry out the process of the invention, an initiator system is used in which at least one of the constituents is insoluble in the organic phase of the reaction mixture, it being necessary for said constituent or constituents to be soluble in the aqueous phase.

Exemplary initiator systems include, for example: persalts, hydrogen peroxide; persalts or hydrogen peroxide in combination with an inorganic or organic reducing agent, such as polyvalent metal salts and, in particular, iron and copper salts, bisulfites, metabisulfites, thiosulfates and sulfinates, ascorbic acid, and others. Systems in which one of the components is soluble in the organic phase and slightly soluble in water and insoluble in the organic phase, include the following: systems formed from oxidizing agents such as peroxides, in particular acetyl cyclohexanesulfonyl peroxide, hydroperoxides, such as cumene hydroperoxide and tert-butyl hydroperoxide, activated by reducing agents such as polyvalent metal salts, in particular iron or copper salts, and more particularly by salts such as bisulfites, metabisulfites, thiosulfates or sulfinates, or organic reducing agents, such as ascorbic acid, and others; systems formed from reducing components which are soluble in the organic phase and sparingly soluble in water, such as benzoin and acetylacetonates, and activating oxidizing components which are insoluble in the organic phase and soluble in water, such as persalts or hydrogen peroxide.

The initiator system generally constitutes from 0.01% to 1% and preferably from 0.02% to 0.1% by weight with respect to the (co)monomer(s) used. The initiator system generally comprises from 0.01% to 5% and preferably from 0.05% to 1.5% by weight with respect to the water in the aqueous solution.

Furthermore, it is possible to add, in addition to the initiator and surfactant systems, at least one water-soluble compound to the aqueous phase. The following are exemplary such soluble compounds: an inorganic salt, such as calcium chloride, an organic compound, such as methylene blue, or, alternatively, a water-soluble monomer, such as acrylic acid.

The amount of water-soluble compound(s) constitutes from 0.001% to 50% and preferably from 0.05% to 10% by weight with respect to the water in the aqueous solution.

It is also possible to add at least one chain-limiting compound to said aqueous phase. A mercaptan, such as lauryl mercaptan or mercaptoethanol, is exemplary. The amount of chain limiter(s) generally constitutes from 0.01% to 5% by weight and preferably from 0.05% to 1% by weight, with respect to the (co)monomer(s).

The (co)monomers used according to the invention have a certain solubility in the finely dispersed aqueous phase described above.

In general, their solubility in water at 20° C. is greater than 0.001 g/l. By way of example, the solubility of MMA in water at 20° C. is 16 g/l and that of styrene at 70° C. is 0.16 g/l.

They are selected, in particular, from among the alkyl acrylates, such as butyl acrylate, the alkyl methacrylates, such as methyl methacrylate, styrene monomers such as styrene, and acetates, such as vinyl acetate, and the other vinyl monomers, provided that the (co)polymer formed is insoluble in the organic phase and that the nonsolvents used are miscible with each other and with the (co)monomers.

The homogenous mixture of (co)monomers and nonsolvent(s) may, in particular, be produced directly in the polymerization reactor or in another mixer, in accordance with one or another of the embodiments described above. The volume of nonsolvent(s) used generally ranges from 5% to 95% and preferably from 10% to 70% of the volume of the (co)monomer composition.

The (co)polymers formed are, whatever the stage of the process according to the invention, soluble in their (co)monomer composition, but are insoluble in the mixture of nonsolvent(s) and (co)monomers which has not reacted, i.e., the organic phase.

The following are exemplary (co)polymers and nonsolvent(s) according to the invention:

(i) Polymethyl methacrylate (PMMA), which is insoluble in a mixture containing methyl methacrylate and from 5% to 95% and preferably from 10% to 75% by volume of nonsolvent, such as hexane;

(ii) Polystyrene, which is insoluble in a mixture containing styrene and from 5% to 95% and preferably from 10% to 75% by volume of nonsolvent, such as ethanol;

(iii) Copolymers produced from a comonomer composition of methyl methacrylate and from 0.5% to 30% and preferably from 0.5% to 15% by weight of vinyl acetate and containing from 5% to 95% and preferably from 10% to 75% by volume, with respect to the comonomer composition, of nonsolvent, such as methanol.

The polymerization reactions according to the invention may be carried out over a wide temperature range, generally ranging from 0° to 200° C. and preferably from 50° to 100° C. However, it is also possible to carry out the polymerizations at temperatures of less than or equal to 0° C., by adding at least one antifreeze agent to the polymerization recipe, such as, in particular, calcium chloride, or a polyalcohol, beforehand to the aqueous solution of at least a fraction of the initiator system which is to be dispersed.

In the reactor, the (co)polymer formed according to the invention is in suspension in a liquid phase of nonsolvent(s), unreacted (co)monomer composition and, optionally, water. The liquid phase is removed in order to recover the (co)polymer in pulverulent form. Various techniques may be used, depending on the diameter of the (co)polymer particles obtained and on the nature of said mixture.

Exemplary processes for recovering the (co)polymer particles in pulverulent form include:

(i) draining the suspension, followed by settling and then drying;

(ii) draining and then spraying the particles (in the event of particles having an average diameter of less than about 10 μm); and (iii) degassing with stirring and then applying vacuum and finally drying in the reactor.

Coagulation, dewatering, filtration and/or flaking operations may also be carried out.

The pulverulent (co)polymer is then generally subjected to a screening operation to isolate the conforming product, defined as that passing through a sieve of a given mesh opening, selected depending on the average particle diameter desired to be obtained and on the use for which such product is intended.

In order to further illustrate the present invention and the advantages thereof, the following specific examples are given, it being understood that same are intended only as illustrative and in nowise limitative.

In said examples to follow, the apparent density of the (co)polymers was determined in accordance with NFT standard 51-003 (method A);

The plasticizer uptake of the (co)polymers at room temperature was determined in accordance with NFT standard 51-782;

The percentage by Weight of 315 μm oversize was determined after passing the resin through a sieve having a mesh opening of 315 μm.

EXAMPLE 1

186 g of methyl methacrylate (MMA) stabilized by 0.0015% by weight of hydroquinone monomethyl ether and 198 g of n-hexane were introduced into a vertical 1—1 glass reactor fitted with a twin turbine stirrer having six flat blades rotating at 500 rev/min and with a baffle, after applying a vacuum. An aqueous solution of 0.8 g of potassium persulfate in 152.5 g of water was then added and a vacuum was reapplied for 1 min.

The temperature of the mixture was adjusted to 70° C. over the course of 40 min and then maintained constant.

After polymerization for 2 h at 70° C. followed by cooling to room temperature, the product obtained, which was in form of a suspension of polymer in the nonsolvent and the residual monomer, was emptied and dried in an oven at 80° C. 170 g of polymethyl methacrylate (PMMA) in pulverulent form were collected.

EXAMPLE 2 (Comparative)

The apparatus and the polymerization conditions were the same as in Example 1, except for the addition of nonsolvent (n-hexane).

The product formed during the polymerization was a paste, the viscosity of which increased with the degree of conversion. This viscous and sticky paste could not be drained directly from the reactor.

EXAMPLE 3

The apparatus and the polymerization conditions were the same as in Example 1, except that the n-hexane was replaced by 234 g of cyclohexane. After polymerization for 2 h at 70° C., emptying and drying, 182 g of PMMA in pulverulent form were collected.

EXAMPLE 4

The apparatus and the polymerization conditions were the same as in Example 1, except that the n-hexane was replaced by 212 g of decalin. After polymerization for 2 h at 70° C., emptying and drying, 134 g of PMMA in pulverulent form were collected.

EXAMPLE 5

The apparatus and the polymerization conditions were the same as in Example 1, except that the MMA/nonsolvent ratio was reduced by half for the same degree of filling of the reactor. Therefore, 130 g of MMA and 277 g of n-hexane and then 5.5 g of potassium persulfate in 105 g of water were added. After polymerization for 2 h at 70° C., emptying and drying, 96 g of PMMA in pulverulent form were collected.

EXAMPLE 6

The apparatus and the polymerization conditions were the same as in Example 1, except that the water/MMA ratio was reduced by half. Therefore, 232 g of MMA and 247 g of n-hexane and then 9.9 g of potassium persulfate in 100 g of water were added. After polymerization for 2 h at 70° C., emptying and drying, 202 g of PMMA in pulverulent form were collected.

EXAMPLE 7

The apparatus and the polymerization conditions were the same as in Example 1, except that the water/MMA ratio was multiplied by two. Therefore, 186 g of MMA and 198 g of n-hexane and then 8 g of potassium persulfate in 305 g of water were added. After polymerization for 2 h at 70° C., emptying and drying, 173 g of PMMA in pulverulent were collected.

EXAMPLE 8

The apparatus and the polymerization conditions were the same as in Example 1, except that the stirring speed was reduced by half (250 rev/min). After polymerization for 2 h at 70° C., emptying and drying, 146 g of PMMA in pulverulent form were collected.

EXAMPLE 9

The apparatus was the same as in Example 1. 186 g of MMA and 198 g of n-hexane were introduced into the reactor, in which the speed of the rotary stirrer was 500 rev/min, and after applying a vacuum. A previously homogenized solution containing 0.8 g of potassium persulfate and 0.46 g of dodecylbenzenesulfonate in 152.5 g of water was then added. Vacuum was reapplied for 1 min. The temperature of the mixture was adjusted to 70° C. over the course of 40 min and was maintained constant. After polymerization for 2 h at 70° C. and then cooling to room temperature, the product obtained, which was in the form of a suspension of polymer in the nonsolvent and the residual monomer, was emptied and dried in an oven at 80° C. 176 g of PMMA in pulverulent form were collected.

EXAMPLE 10

The apparatus and the polymerization conditions were the same as in Example 9, except that the amount of dodecylbenzenesulfonate used was 0.15 g. After polymerization for 2 h at 70° C., emptying and drying, 179 g of PMMA in pulverulent form were collected.

EXAMPLE 11

The apparatus and the polymerization conditions were the same as in Example 9, except that the amount of dodecylbenzenesulfonate was replaced by 1 g of colloidal ethyl-hydroxyethyl cellulose. After polymerization for 2 h at 70° C., emptying and drying, 177 g of PMMA in pulverulent form were collected.

EXAMPLE 12

The apparatus and the operating conditions were the same as in Example 9, except that the dodecylbenzenesulfonate was replaced by 1 g of colloidal solid polyvinyl alcohol having a degree of hydrolysis of 72.5% and a weight-average molecular weight of 35,000. After polymerization for 2 h at 70° C., emptying and drying, 170 g of PMMA in pulverulent form were collected.

EXAMPLE 13

The apparatus and the operating conditions were the same as in Example 1, except that 0.56 g of lauryl mercaptan were also added to the aqueous phase. After polymerization for 2 h at 70° C., emptying and drying, 171 g of PMMA in pulverulent form were collected.

EXAMPLE 14 (Comparative)

By way of comparison, the various characteristics of a PMMA resin produced in suspension and marketed by ALTULOR for the production of extruded plates, themselves marketed under the name ALTULEX, were determined.

EXAMPLE 15

The apparatus was the same as in Example 1. 169 g of MMA, 18.5 g of vinyl acetate and 198 g of n-hexane were introduced into the reactor, in which the speed of the rotary stirrer was 500 rev/min, and after applying a vacuum. A solution of 0.8 g of potassium persulfate and 0.25 g of potassium metabisulfite in 152.5 g of water was then added and vacuum was reapplied for 1 min. The temperature of the mixture was adjusted to 55° C. over the course of 40 min and was maintained constant. After polymerization for 2 h at 55° C. and then cooling to room temperature, the product, which was in the form of a suspension of copolymer in the nonsolvent and the residual monomers, was emptied out. The product was dried in an oven at 60° C. 160 g of methyl methacrylate/vinyl acetate copolymer in pulverulent form were collected.

EXAMPLE 16

The apparatus and the polymerization conditions were the same as in Example 1, but the monomer used was styrene (181 g). After polymerization for 2 h at 70° C., emptying and drying, 18.1 g of polystyrene was collected.

The characteristics of the processes and the products of each of the above examples are reported in Table 1:

TABLE 1

| Example No. | NATURE COMPOSITION | NONSOLVENT | INITIAL RATIO BY WEIGHT NONSOLVENT/(CO)MONOMER COMPOSITION | WATER/(CO)MONOMER COMOPOSITION |
|---|---|---|---|---|
| 1 | MMA | N-hexane | 1.06 | 0.82 |
| 2 | MMA | N-hexane | 0 | 0.82 |
| 3 | MMA | | 1.26 | 0.82 |
| 4 | MMA | | 1.14 | 0.82 |
| 5 | MMA | N-hexane | 2.13 | 0.82 |
| 6 | MMA | N-hexane | 1.06 | 0.43 |
| 7 | MMA | N-hexane | 1.06 | 1.64 |
| 8 | MMA | N-hexane | 1.06 | 0.82 |
| 9 | MMA | N-hexane | 1.06 | 0.82 |
| 10 | MMA | N-hexane | 1.06 | 0.82 |

TABLE 1-continued

| Example No. | NATURE COMPOSITION | NONSOLVENT | INITIAL RATIO BY WEIGHT NONSOLVENT/(CO)MONOMER COMPOSITION | WATER/(CO)MONOMER COMOPOSITION |
|---|---|---|---|---|
| 11 | MMA | N-hexane | 1.06 | 0.82 |
| 12 | MMA | N-hexane | 1.06 | 0.82 |
| 13 | MMA | N-hexane | 1.06 | 0.82 |
| 14 | MMA | | | |
| 15 | MMA/VINYL ACETATE | N-hexane | 1.06 | 0.81 |
| 16 | STYRENE | N-hexane | 1.09 | 0.84 |

TABLE 2

| Example No. | ADDITIVES | STIRRING SPEED (rev/min) | DEGREE OF CONVERSION % |
|---|---|---|---|
| 1 | / | 500 | 91 |
| 2 | / | 500 | |
| 3 | / | 500 | 97.8 |
| 4 | / | 500 | 72 |
| 5 | / | 500 | 73.8 |
| 6 | / | 500 | 87 |
| 7 | / | 500 | 93 |
| 8 | / | 500 | 78.5 |
| 9 | dodecylbenzenesulfonate | 500 | 94.6 |
| 10 | dodecylbenzenesulfonate | 500 | 96.2 |
| 11 | ethylhydroxyethylcellulose | 500 | 95.2 |
| 12 | polyvinyl alcohol | 500 | 91.4 |
| 13 | lauryl mercaptan | 500 | 91.9 |
| 14 | | | |
| 15 | / | 500 | 85.3 |
| 16 | / | 500 | 10 |

TABLE 3

| Example No. | APPARENT DENSITY (g/cm$^3$) | PLASTICIZER UPTAKE AT ROOM TEMPERATURE (g DOP/100 g of resin) | PERCENTAGE BY WEIGHT OF OVERSIZE AT 315 μm |
|---|---|---|---|
| 1 | 450 | 11 | 5 |
| 2 | | | |
| 3 | | 12 | 79 |
| 4 | | 30 | 5 |
| 5 | | 26 | 85 |
| 6 | | 5 | 77 |
| 7 | | 44 | 49 |
| 8 | | 15 | 86 |
| 9 | | 5 | 25 |
| 10 | 350 | 80 | 92 |
| 11 | | 7 | 90.5 |
| 12 | | 6 | 82 |
| 13 | | 8 | 85.5 |
| 14 | 780 | 2 | 98 |
| 15 | | 31 | 35.5 |
| 16 | | 5 | 5 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of (co)polymer particulates soluble in their corresponding (co)monomer composition, comprising finely dispersing an aqueous phase including at least one polymerization initiator in an organic phase which comprises such (co)monomer composition and at least one nonsolvent for such (co)polymer which is miscible with such (co)monomer composition, and suspended emulsion polymerizing such mixed-phase polymerization recipe.

2. The process as defined by claim 1, comprising conducting said suspended emulsion polymerization in a single stage, under stirring.

3. The process as defined by claim 1, comprising conducting said suspended emulsion polymerization in a first stage, under agitation until a degree of (co)monomer conversion of from 1% to 50% is attained, next optionally adding a complementary admixture of additional (co)monomer composition and said at least one nonsolvent to the medium of polymerization, and then completing, in a second stage, said suspended emulsion polymerization, under agitation but to such extent as to inhibit reagglomeration of developing (co)polymer particles.

4. The process as defined by claim 1, comprising conducting a suspended emulsion prepolymerization in a first stage, under agitation until a degree of (co)monomer conversion of from 1% to 30% is attained, and then completing, in a second stage, said suspended emulsion polymerization, under agitation but to such extent as to inhibit reagglomeration of developing (co)-polymer particles.

5. The process as defined by claim 2, further comprising adding a complementary admixture of additional (co)monomer composition and said at least one nonsolvent to the medium of polymerization, intermediate said first and said second stages.

6. The process as defined by claim 1, said medium of polymerization comprising at least one emulsifier.

7. The process as defined by claim 6, said at least one emulsifier comprising at least one quaternary ammonium salt, a fatty acid soap, alkali metal alkyl sulfate, alkali metal alkyl sulfonate, alkali metal alkylaryl sulfonate, alkali metal alkyl sulfosuccinate, alkali metal phosphate, or condensation product of ethylene oxide and-/or propylene oxide with a hydroxylated organic compound.

8. The process as defined by claim 6, said medium of polymerization comprising at least one suspending agent.

9. The process as defined by claim 8, said at least one suspending agent comprising a polyvinyl alcohol, a cellulose derivative, or a gelatin.

10. The process as defined by claim 1, said (co)monomer composition comprising an alkyl acrylate, an alkyl methacrylate, a styrene monomer, an olefinically unsaturated acetate, or a vinyl monomer.

11. The process as defined by claim 10, said (co)monomer composition comprising methyl methacrylate or styrene.

12. The process as defined by claim 10, said (co)monomer composition comprising methyl methacrylate and vinyl acetate.

13. The process as defined by claim 1, at least one constituent of said at least one polymerization initiator being insoluble in said organic phase and soluble in said aqueous phase.

14. The process as defined by claim 1, said at least one polymerization initiator comprising a persalt or hydrogen peroxide, or persalt or hydrogen peroxide in combination with a reducing agent.

15. The process as defined by claim 1, said at least one polymerization initiator comprising from 0.01% to 1% by weight of said (co)monomer composition.

16. The process as defined by claim 15, said at least one polymerization initiator comprising from 0.01% to 5% by weight of the water which comprises said aqueous phase.

17. The process as defined by claim 1, said aqueous phase comprising a water-soluble inorganic salt, organic compound or monomer.

18. The process as defined by claim 1, the amount of water comprising said aqueous phase ranging from 10% to 80% by volume of said organic phase.

19. The process as defined by claim 18, the amount of water comprising said aqueous phase being at least 10% by volume of said (co)monomer composition and said at least one nonsolvent.

20. The particulate (co)polymer product of the process as defined by claim 1.

* * * * *